United States Patent
Kikuichi et al.

(10) Patent No.: US 8,946,956 B2
(45) Date of Patent: Feb. 3, 2015

(54) FIXING STRUCTURE OF RADIAL LEAD OF ROTATING ELECTRICAL MACHINE

(75) Inventors: Yoshihide Kikuichi, Tokyo (JP); Kiyonori Koga, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 18 days.

(21) Appl. No.: 13/643,140

(22) PCT Filed: Aug. 18, 2010

(86) PCT No.: PCT/JP2010/063922
§ 371 (c)(1),
(2), (4) Date: Oct. 24, 2012

(87) PCT Pub. No.: WO2012/023184
PCT Pub. Date: Feb. 23, 2012

(65) Prior Publication Data
US 2013/0038154 A1  Feb. 14, 2013

(51) Int. Cl.
*H02K 11/00* (2006.01)
*H02K 13/00* (2006.01)
*H02K 5/124* (2006.01)

(52) U.S. Cl.
CPC .............. *H02K 13/003* (2013.01); *H02K 5/124* (2013.01)
USPC .................................. 310/71; 81/64; 411/178

(58) Field of Classification Search
USPC .................. 310/71; 81/64; 411/108, 113, 171
See application file for complete search history.

(56) References Cited

U.S. PATENT DOCUMENTS 5,382,856 A   1/1995 Keck et al.

FOREIGN PATENT DOCUMENTS

| JP | 58-70074 U | 5/1983 | | |
|---|---|---|---|---|
| JP | 61-54835 A | 3/1986 | | |
| JP | 5-95653 A | 4/1993 | | |
| JP | 05095653 A | * 4/1993 | ............ | H02K 13/02 |
| JP | 6-237558 A | 8/1994 | | |
| JP | 2004-516798 A | 6/2004 | | |
| WO | WO 02/52699 A2 | 7/2002 | | |

OTHER PUBLICATIONS

JP 05095653 A machine translation Apr. 3, 2014.*
Office Action (Notification of Reasons for Refusal) issued on Oct. 29, 2013, by the Japanese Patent Office in corresponding Japanese Patent Application No. 2012-529431, and an English Translation of the Office Action. (6 pages).
International Search Report (PCT/ISA/210) issued on Nov. 16, 2010, by the Japanese Patent Office as the International Searching Authority for International Application No. PCT/JP2010/063922.
Office Action issued on Jul. 28, 2014, by the Chinese Patent Office in corresponding Chinese Patent Application No. 201080067989.8, and an English translation of the Office Action. (11 pages).

* cited by examiner

*Primary Examiner* — Tran Nguyen
*Assistant Examiner* — Leda Pham
(74) *Attorney, Agent, or Firm* — Buchanan Ingersoll & Rooney PC

(57) ABSTRACT

A fixing structure of a radial lead of a rotating electrical machine connects slip rings provided to a rotation shaft of a rotor and axial leads disposed in a center hole of the rotation shaft and supplying a current to a rotor coil. A radial lead is inserted into a radial lead hole penetrating through the rotation shaft in a radial direction from the center hole and a tapered male screw formed at one end is threaded into a tapered female screw formed in the axial lead while the other end is electrically connected to the slip ring. A sealing member installed to a step portion of the radial lead hole is fastened, via a spacer, by a fastening nut threaded into a straight screw of the radial lead, so that a side of the center hole is maintained airtight from an outside.

4 Claims, 4 Drawing Sheets

(a) NEGATIVE TERMINAL SIDE / POSITIVE TERMINAL SIDE (b)

FIXING STRUCTURE OF RADIAL LEAD OF ROTATING ELECTRICAL MACHINE

TECHNICAL FIELD

The present invention relates to a fixing structure that fixes radial leads to be connected to slip rings of a rotating electrical machine to a rotation shaft.

BACKGROUND ART

As a rotating electrical machine, for example, an AC synchronous generator supplies a field coil of a rotor of the generator with a DC current from an outside source to generate a rotating field by rotating the rotor, so that an AC voltage is induced across an armature coil fixed on an outer peripheral side of the rotor. For a current collector portion in the related art serving as an electrical connection portion between the field coil and the outside source, there is a configuration shown, for example, in FIG. 6 and FIG. 7.

FIG. 6 is a partial cross section showing only an upper half of a rotor on a current collector side from a shaft center. Also, FIG. 7 is an enlarged cross section of a portion encircled by an alternate long and short dash line of FIG. 6.

As is shown in FIG. 6, a rotor 31 has a center hole 32a at a center of a rotation shaft 32 and axial leads 33 are disposed in the center hole 32a. The axial leads 33 extend from a main terminal bolt 34 to a pair of radial leads (collector terminal bolts) 35 and are connected to one ends of the respective bolts.

The other end of the main terminal bolt 34 is connected to main field terminal windings 37 held by a press ring 36. The other ends of the radial leads 35 are connected to a pair of slip rings 38a and 38b attached to the rotation shaft 32.

A DC current is supplied to the slip rings 38a and 38b from carbon brushes (not shown) and the current is passed toward the main field terminal windings 37 by way of the radial leads 35, the axial leads 33, and the main terminal bolt 34.

A detail of a radial lead portion will be described with reference to FIG. 7. The radial lead 35 has male screws formed at an upper end side and a lower end side and a smooth intermediate portion. The intermediate portion is surrounded by an insulating sleeve. The lower end side is threaded into a female screw of the axial lead 33 and fixed therein. The upper end side is connected to a connection lead line 41 of the slip ring by a copper nut 39 and an inner copper nut 40. A gasket 43 sandwiched between a seal washer 44 and a gasket bushing 45 is inserted into a radial lead hole 42 provided to the rotation shaft 32. At a position in the vicinity of an outer periphery of the rotation shaft 32, a fastening bolt 46 is fastened to a female screw portion formed in the radial lead hole 42 to compress the gasket 43, so that airtightness is maintained. An interior of a generator is filled with a cooling refrigerant, for example, a hydrogen gas. The hydrogen gas also flows into the center hole 32a of the rotation shaft 32 and fills a clearance between the center hole 32a and the axial lead 33. Hence, the gasket 43 plays a role as a seal that prevents the hydrogen gas from leaking to the outside (see, for example, Patent Document 1).

CITED LIST

Patent Document

Patent Document 1: JP-A-6-237558 (pp. 3-4, FIG. 1 and FIG. 3)

SUMMARY OF THE INVENTION

Problems that the Invention is to Solve

According to the structure of the radial lead portion shown in Patent Document 1, in the radial lead hole 42 in which to insert the radial lead 35, the gasket 43 is fastened by the fastening bolt 46 as described above so as to seal a cooling gas in the generator. However, the female screw portion in which to thread the fastening bolt 46 is provided at a position in the vicinity of an outermost periphery of the rotation shaft 32. The rotor 31 is elongate in an axial direction and rotates at a high speed while being supported on bearings in the vicinity of both ends of the rotation shaft 32. Herein, stress is applied on the rotation shaft 32 by rotary bending that occurs when the rotation shaft 32 rotates under bending load. Accordingly, deterioration of strength resulting from fatigue caused by rotary bending becomes a problem for the rotation shaft 32.

Besides a fastening force of the screw, a screw portion is subjected to stress concentration on the screw at the time of rotary bending and the stress becomes highest on the outermost periphery of the rotation shaft 32. Accordingly, in the configuration of Patent Document 1 where the screw portion is formed in the vicinity of the outermost periphery, a shaft diameter of the rotation shaft is limited by a circumferential velocity of the brushes and the diameter cannot be increased by exceeding the limit. Because the radial lead hole having the screw portion at such a point is provided, it is difficult to improve strength against fatigue.

The invention was devised to solve the problems as above and has an object to obtain a radial lead portion of a rotating electrical machine with improved strength against fatigue caused by rotary bending or the like for radial lead portions connected to slip rings of the rotating electrical machine.

Means for Solving the Problems

A fixing structure of a radial lead portion of a rotating electrical machine of the invention is a fixing structure of a radial lead of a rotating electrical machine, which is furnished with a function of connecting slip rings provided to a rotation shaft of a rotor and axial leads provided inside a center hole of the rotation shaft and supplying a current to a rotor coil and a function of preventing a leakage of a refrigerant gas within the rotation shaft. The radial lead is inserted into a radial lead hole penetrating through the rotation shaft in a radial direction from the center hole. A male screw formed at one end is threaded into a female screw formed in the axial lead fixed therein while the other end is electrically connected to the slip ring. A sealing member installed to a step portion of the radial lead hole is fastened, via a spacer, by a fastening nut threaded into the other end of the radial lead, so that a side of the center hole is maintained airtight from an outside.

Advantage of the Invention

According to the fixing structure of a radial lead portion of a rotating electrical machine of the invention, the radial lead is inserted into the radial lead hole penetrating through the rotation shaft in a radial direction from the center hole. The male screw formed at one end is threaded into the female screw formed in the axial lead and fixed therein while the other end is electrically connected to the slip ring. The sealing member installed to the step portion of the radial lead hole is fastened, via the spacer, by the fastening nut threaded into the other end of the radial lead to maintain airtightness. Hence, because the radial lead hole has no screw portion that becomes a weak point for fatigue caused by rotary bending and torsional vibration, it becomes possible to enhance strength against fatigue by improving strength against fatigue caused by rotary bending and torsional vibration.

MODE FOR CARRYING OUT THE INVENTION

Basic Technology

Prior to a description of a first embodiment of the invention, a basic technology underlying the invention will be described.

Figure 1:
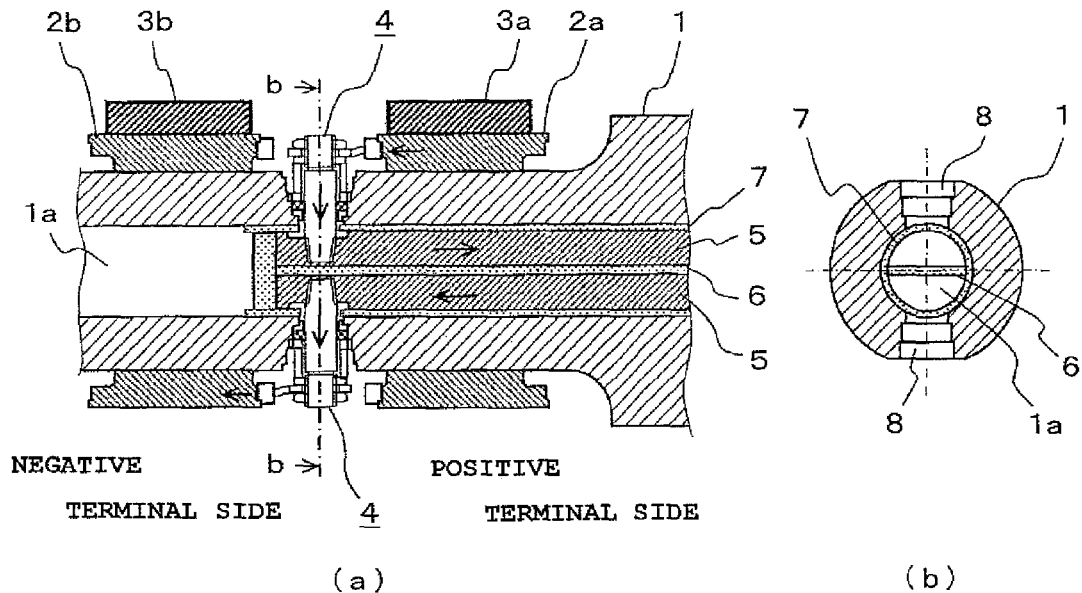
FIG. 1 is a partial cross section showing a structure in the vicinity of a radial lead portion of a rotating electrical machine in the basic technology.

FIG. 1 is a partial cross section showing a structure in the vicinity of a radial lead portion of a rotating electrical machine, for example, a turbine generator. FIG. 1(a) is a sectional cross section and FIG. 1(b) is a cross section when viewed along the line b-b indicated by arrows of FIG. 1(a).

Figure 6:
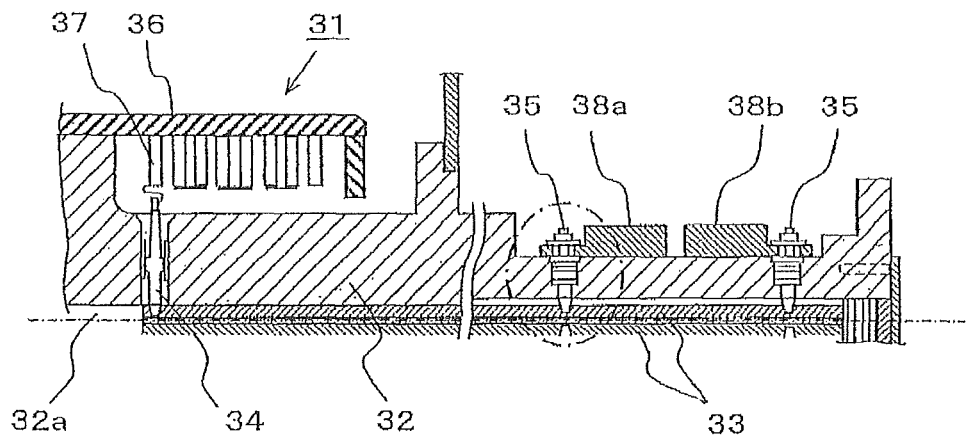
FIG. 6 is a partial cross section showing a structure in the vicinity of a radial lead portion of a rotary electrical machine in the related art.
Figure 7:
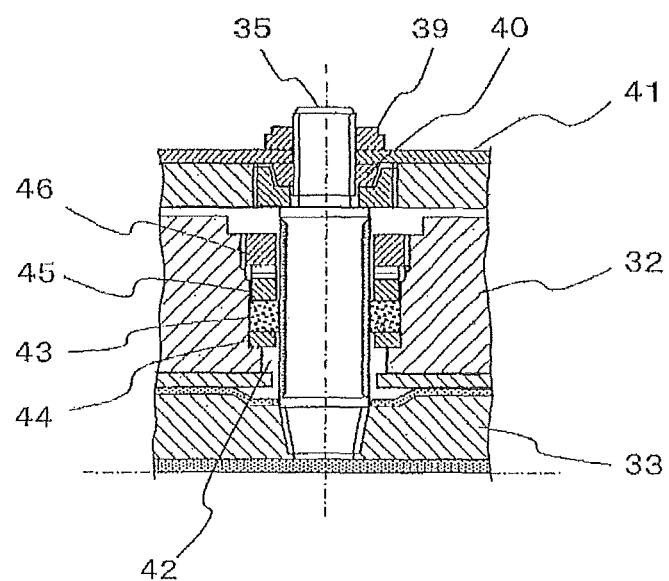
FIG. 7 is an enlarged cross section of a major portion of FIG. 6.

FIG. 1(a) shows a portion corresponding to FIG. 6 described in the background art above. It should be noted, however, that FIG. 1(a) is inverted left to right from FIG. 6 and the right side of the drawing is a rotor coil side of a rotor main body.

As is known, a generator magnetizes the rotor bypassing electricity through the rotor coil to rotate the rotor for a magnetic flux interlinking with a stator coil to change, so that an electromotive force is induced at the stator coil. In order to excite the rotor, it is necessary to supply power from an outside source and an entrance and an exit to this end are slip rings.

As is shown in FIG. 1(a), a pair of slip rings 2a and 2b for a positive terminal and a negative terminal, respectively, is attached to a rotation shaft 1 of a rotor supported on a pair of bearings (not shown) at one end of the rotation shaft 1 on an external side. Brushes 3a and 3b made of carbon are pressed by unillustrated springs and in contact with the slip rings 2a and 2b, respectively, in a slidable manner and a DC current is supplied to the slip rings 2a and 2b via the brushes 3a and 3b, respectively.

As are indicated by arrows, a current supplied by the slip ring 2a flows from one of a pair of radial lead portions 4 (described below) provided to the rotation shaft 1 in a radial direction and passes through one axial lead 5 provided in a center hole 1a of the rotation shaft 1. Then, the current is extracted in a radial direction at the other end and flows to a rotor coil (not shown). The current from the rotor coil returns to the other axial lead 5 and flows into the slip ring 2b by way of the other radial lead portion 4.

As is shown in FIG. 1(b), the center hole 1a of the rotation shaft 1 is formed concentrically with a central axis of the rotation shaft 1. An interior thereof is divided into halves by an insulating member 6 and the axial lead 5 is inserted into each space. It should be noted, however, that the radial lead portions 4 and the axial leads 5 are not shown in FIG. 1(b). The axial leads 5 and the center hole 1a are electrically isolated by a cylindrical insulating member 7.

Also, in order to enhance cooling performance, an interior of the generator is filled with a refrigerant, for example, a hydrogen gas, and each portion is sealed to prevent the filled hydrogen gas from leaking to the outside. The radial lead portions 4 are no exceptions and, as will be described in detail below, a sealing member to prevent a hydrogen gas in the inside from leaking to the outside is inserted therein.

As has been described in the problem section above, when the rotation shaft is subjected to rotary bending stress, the stress becomes highest on the outermost periphery of the rotation shaft. Also, besides the rotary bending, torsional vibration occurs in the rotation shaft in the event of accident, such as a sudden short-circuit. Under torsional vibration, stress also becomes highest on the outermost periphery of the rotation shaft.

Figure 2:
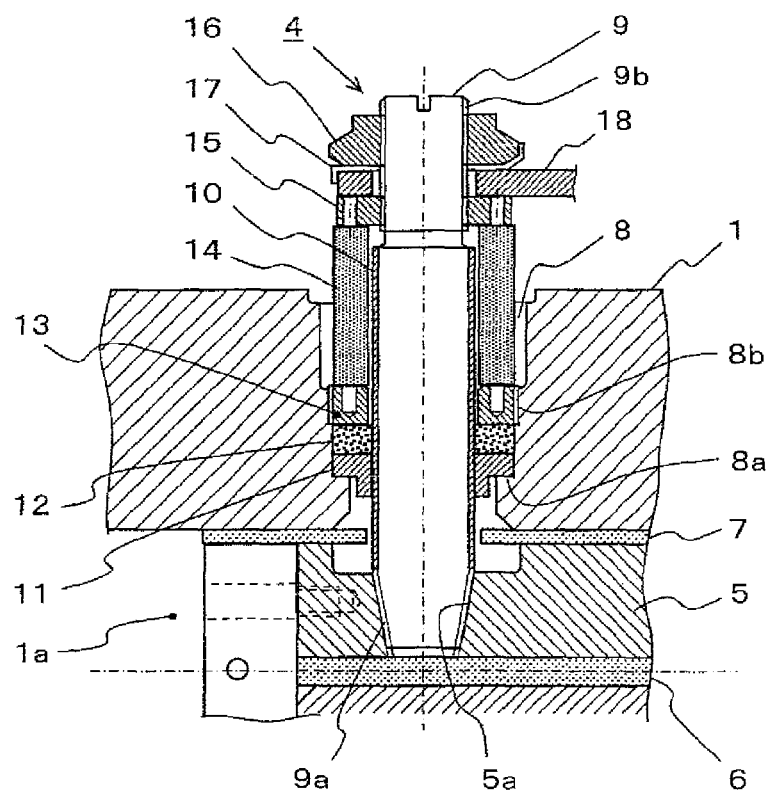
FIG. 2 is an enlarged cross section of a major portion of FIG. 1.

In view of the foregoing, a configuration as shown in FIG. 2 was discussed as a structure of the radial lead portion 4 with improved strength against fatigue caused by rotary bending and the like. FIG. 2 is an enlarged cross section of the radial lead portion 4 of FIG. 1. Hereinafter, a detail of the radial lead portion 4 will be described according to FIG. 2.

Firstly, radial lead holes 8 in which to insert the radial lead portions 4 will be described. The radial lead holes 8 are provided in two points at positions radially opposed by 180 degrees in an intermediate portion between a pair of the slip rings 2a and 2b provided to the rotation shaft 1 and penetrate through the rotation shaft 1 in the radial direction from the center hole 1a.

As is shown in FIG. 2, a sectional shape of the radial lead hole 8 has a step portion 8a formed by making a diameter in the vicinity of an opening end opening on the side of the center hole 1a of the rotation shaft 1 smaller, a female screw portion 8b formed in a region closer to the inside than the outer opening portion in a length direction of the radial lead hole 8, and a large diameter portion having a slightly larger diameter formed on the outside of the female screw portion 8b.

A radial lead 9 is a center conductor in the radial lead portion 4. A tapered male screw 9a is formed on a side connected to the axial lead 5 and a straight screw 9b having a one-step narrower diameter than the intermediate portion is formed at the opposite end connected to the slip ring 2a or 2b. An insulating tube 10 is provided to the straight portion in the intermediate portion in close contact with each other.

The radial lead 9 and the axial lead 5 are connected by threading the tapered male screw 9a of the radial lead 9 into the tapered female screw 5a provided to the axial lead 5 and the radial lead 9 is fixed so as not to fall out by a centrifugal force.

The radial lead portion 4 is assembled as follows. Firstly, the tapered male screw 9a of the radial lead 9 is screwed in the tapered female screw 5a of the axial lead 5 and fixed therein. Subsequently, a seal support 11 is inserted into the step portion 8a of the radial lead hole 8. An inside diameter of the seal support 11 is large enough to loose-fit the insulating tube 10 around the radial lead 9 with a fine clearance. Subsequently, a sealing member 12 is inserted. The sealing member 12 has an inside diameter substantially as large as an outside diameter of the insulating tube 10 and an outside diameter substantially as large as an inside diameter of the radial lead hole 8. As a material thereof, for example, fluorine-containing rubber is used.

Subsequently, a ring-shaped fastening bolt 13 is screwed in the female screw portion 8b provided to the intermediate portion of the radial lead hole 8. Consequently, the sealing member 12 is compressed and provides sealing as the inside diameter side thereof comes into close contact with the insulating tube 10 and the outside diameter side thereof comes into close contact with an inner wall of the radial lead hole 8. Also, the sealing member 12 is fixed so as to withstand a centrifugal force developed while the rotation shaft 1 rotates. It should be noted that an inside diameter of the fastening bolt 13 is slightly larger than the outside diameter of the insulating tube 10.

Subsequently, a cylindrical spacer 14 having an inside diameter slightly larger than the outside diameter of the insulating tube 10 is inserted on an upper part of the fastening bolt 13 and the spacer 14 is fastened by screwing a fastening nut 15 in the straight screw 9b provided to the outer end of the radial lead 9. In this instance, the fastening bolt 13 fastened first also plays a role as a reaction force to a fastening force of the fastening nut 15.

The assembly is completed by further adding fastening with an outer nut 16 with a slip ring connection lead 18 in between. The outer nut 16 is prevented from turning with a claw washer 17. The radial lead portion 4 is formed of reference numerals 9 through 17 described above.

Functions of the radial lead potion 4 and the radial lead hole 8 configured as above will now be described.

In comparison with Patent Document 1 described in the background art above, the basic technology is characterized in that the position of the female screw portion 8b formed in the radial lead hole 8 is shifted toward the shaft center by shifting the attachment position of the sealing member 12 provided to the radial lead hole 8 of the rotation shaft 1 toward the shaft center of the rotation shaft 1 as close as possible.

As has been described above, when the rotation shaft is subjected to rotary bending stress, the stress becomes highest on the outermost periphery of the rotation shaft. In addition, torsional vibration occurs in the rotation shaft in the event of an accident, such as a sudden short-circuit, and the stress also becomes high on the outermost periphery of the rotation shaft under torsional vibration.

With such rotary bending and torsional vibration, screws processed in the radial direction of the rotation shaft themselves are not oriented in a direction of stress concentration. However, stress is constantly applied on the screw portion due to a fastening torque and there is also a risk of a processing flaw. In short, the screw portion is a weak point particularly for rotary bending and torsional vibration.

The radial lead hole 8 has a certain degree of length (depth). Hence, the position of the female screw portion 8b is shifted closer to the center of the rotation shaft 1 where stress is low to the extent possible within a range of this length.

A stress analysis was made with the radial lead portion of the structure as shown in FIG. 2 and a radial lead portion of substantially the same structure as that of FIG. 2 except that the position of the female screw 8b of the radial lead hole 8 is in the vicinity of the outer periphery of the rotation shaft 1, and degrees of stress concentration due to rotary bending and torsional vibration were compared and verified. As a result, it was found that stress concentration on the female screw portion 8b was improved by shifting the position as in FIG. 2.

However, in the course of verification, it was also found that the use of the fastening bolt 13 makes the structure of FIG. 2 not necessarily sufficient in the following point.

That is, when rotary bending and torsional vibration are applied to the rotation shaft 1, the radial lead hole 8 formed in the shape of a circular pillar is forced to change a cross section of a circular shape to an elliptical shape in a direction of torsion particularly by torsion.

On the other hand, the following was verified. That is, because the fastening bolt 13 is of a circular ring shape when viewed in plane and stiff, a contact portion of the female screw portion 8b and the male screw portion of the fastening bolt 13 comes closer in some parts and moves away in the other parts as the cross section of the radial lead hole 8 is changed to an elliptical shape. Because the fastening bolt 13 is pressed from above by the spacer 14, it was verified that stress concentrates to a part of a screw bottom portion of the female screw 8b due to displacement of the contact portion, and this part becomes a weak point and may possibly cause the screw portion to break.

The following will describe a radial lead portion improved further in view of the verification result in the basic technology as above in strength against fatigue caused by rotary bending and torsional vibration.

FIRST EMBODIMENT

Figure 3:
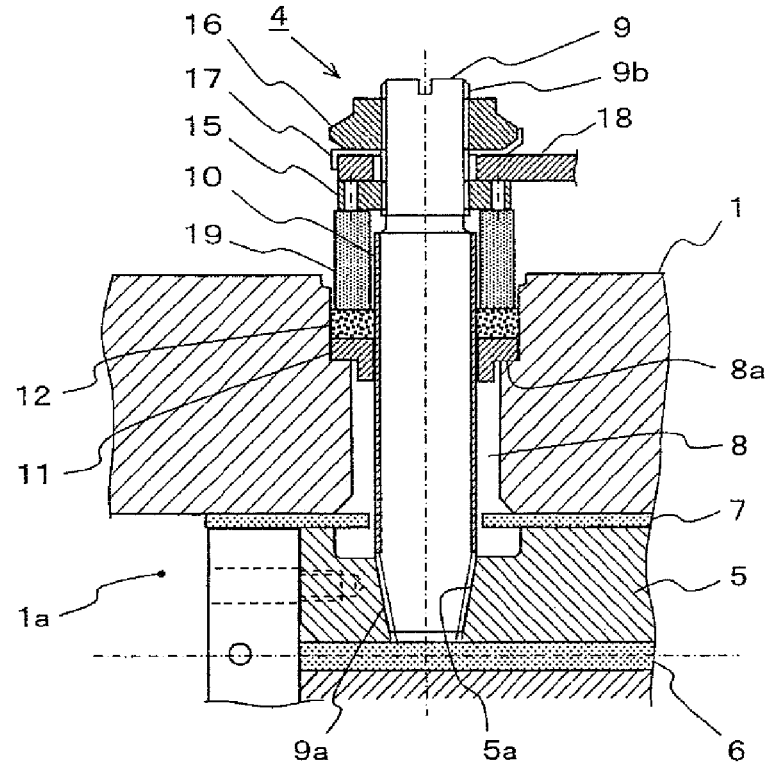
FIG. 3 is a partial cross section of a radial lead portion of a rotating electrical machine according to a first embodiment of the invention.

FIG. 3 is a partial cross section of a radial lead portion of a rotating electrical machine of a first embodiment. This is a portion corresponding to FIG. 2 described in the basic technology above. A description of same portions is omitted herein by labeling the same portions with same reference numerals and a different point will be chiefly described. An overall structure in the vicinity of the radial lead portion is substantially the same as FIG. 1 described in the basic technology above.

A different portion from FIG. 2 is that the fastening bolt 13 of FIG. 2 is omitted. Hereinafter, a description will be given according to FIG. 3.

The radial lead hole 8 has the step portion 8a formed at a midpoint and an outside portion (outer peripheral side of the rotation shaft 1) of the step portion 8a is formed straight by making a diameter one-step larger.

Regarding the assembly, firstly, the tapered male screw 9a of the radial lead 9 is screwed in the tapered female screw 5a of the axial lead 5 and fixed therein. Subsequently, the seal support 11 is inserted into the step portion 8a of the radial lead hole 8. Subsequently, the sealing member 12 is inserted and a cylindrical spacer 19 is inserted on the sealing member 12. The spacer 19 has an inside diameter slightly larger than the outside diameter of the insulating tube 10 and an outer shape is of a size slightly smaller than the inside diameter of the radial lead hole 8 in a portion in which the sealing member 12 is housed.

Subsequently, the sealing member 12 is fastened via the spacer 19 by screwing the fastening nut 15 in the straight screw 9b provided to the outer end of the radial lead 9.

Consequently, the sealing member 12 is compressed and sealing is provided as the inside diameter side comes in close contact with the insulating tube 10 and the outside diameter side comes into close contact with the inner wall of the radial lead hole 8. Also, the sealing member 12 is fixed so as to withstand a centrifugal force developed while the rotation shaft 1 rotates.

Assembly is completed by further adding fastening with the outer nut 16 provided on the fastening nut 15 with the slip ring connection lead 18 in between. The outer nut 16 is provided with a claw washer 17 to prevent turning.

The radial lead portion 4 of the first embodiment is formed of reference numerals 9 through 12, 15 through 17, and 19 described above.

In the assembly work above, the fastening nut 15 is threaded into the straight screw 9b of the radial lead 9. Accordingly, when a fastening force is weak when fastening the fastening nut 15, sealing becomes insufficient, which gives rise to a gas leakage. Conversely, when a fastening force is too strong, there is a risk of causing damage to the sealing member 12, which also gives rise to a gas leakage. It is therefore preferable to manage a fastening force within a range of predetermine values when the fastening nut 15 is fastened.

Although it depends on a capacity of the rotating electrical machine, it was verified that a sufficient sealing effect is obtained and is appropriate when a fastening force is such that the sealing member 12 sinks by 2.7 mm or more.

A function will now be described.

In a case where the rotation shaft is subjected to rotary bending stress or in the event of an accident, such as a sudden short-circuit, while the rotating electrical machine is operating, torsional vibration occurs in the rotation shaft. In this instance, a shape of the radial lead hole 8 in a cross section perpendicular to the axis line of the hole is forced to change to an elliptical shape in a direction of torsion.

However, in this embodiment, the sealing member 12 is fastened by the fastening nut 15 from above via the spacer 19 and no female screw is provided on the inner surface of the radial lead hole 8. Accordingly, even when the cross section of the radial lead hole 8 is changed to an elliptical shape, there is no point at which stress concentrates exceedingly. Hence, in comparison with FIG. 2 in the basic technology where the radial lead hole 8 is provided with the female screw portion 8b and the sealing member 12 is fastened by the fastening bolt 13, it becomes possible to improve strength against fatigue caused by rotary bending and torsional vibration further and enhanced strength against fatigue can be expected.

As has been described, according to a fixing structure of a radial lead of a rotating electrical machine of the first embodiment, the fixing structure of a radial lead of a rotating electrical machine is furnished with a function of connecting slip rings provided to a rotation shaft of a rotor and axial lead rings provided inside a center hole of the rotation shaft and supplying a current to a rotor coil and a function of preventing a leakage of a refrigerant gas within the rotation shaft. The radial lead is inserted into a radial lead hole penetrating through the rotation shaft in a radial direction from the center hole, and a male screw formed at one end is threaded into a female screw formed in the axial lead and fixed therein while the other end is electrically connected to the slip ring. A sealing member installed to a step portion of the radial lead hole is fastened, via a spacer, by a fastening nut threaded into the other end of the radial lead, so that a side of the center hole is maintained airtight from an outside. Hence, in comparison with a structure in which a screw portion is provided to the radial lead hole, because there is no concave-convex cross section of the screw portion that becomes a weak point for fatigue caused by rotary bending and torsional vibration, no portion is subjected to high stress concentration. Accordingly, it becomes possible to enhance strength against fatigue by improving strength against fatigue caused by rotary bending and torsional vibration.

Also, because the sealing member is fastened with a managed predetermined fastening force, the sealing member can be prevented from being fastened too loose or too tight. It thus becomes possible to provide a fixing structure of a radial lead of a rotating electrical machine with excellent sealing performance.

Also, because the fastening force is managed so that a sink-in amount of the sealing member is 2.7 mm or more, it becomes possible to maintain a sealing quality of the radial lead portion in a satisfactory manner.

SECOND EMBODIMENT

Figure 4:
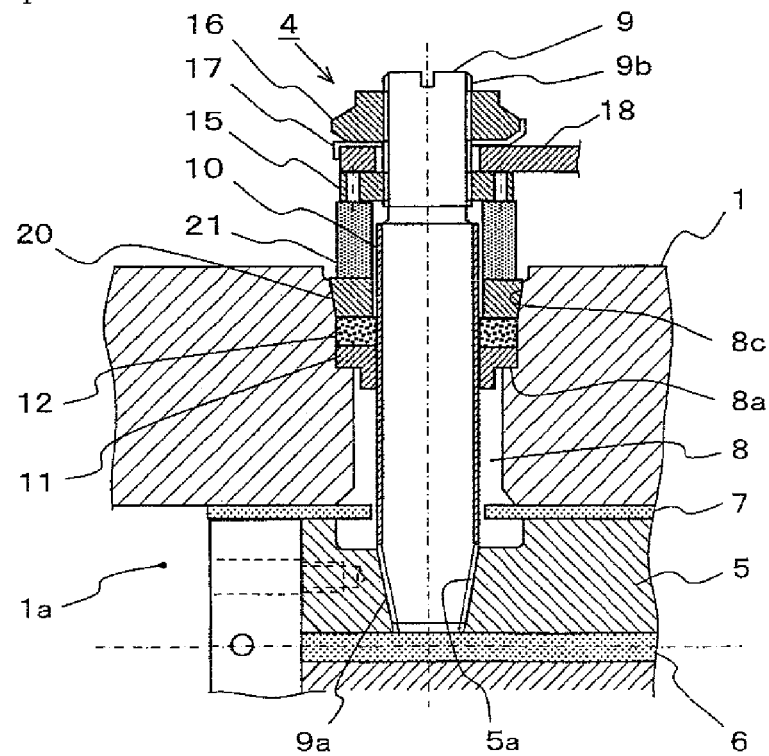
FIG. 4 is a partial cross section of a radial lead portion of a rotating electrical machine according to a second embodiment of the invention.

FIG. 4 is a partial cross section of a radial lead portion of a rotating electrical machine of a second embodiment, and this is a portion corresponding to FIG. 3 of the first embodiment above. A description of portions same as those of FIG. 3 is omitted herein by labeling the same portions with same reference numerals and a different point will be chiefly described.

A different portion from FIG. 3 is a structure of a portion fastening the sealing member 12. Hereinafter, the different portion will be described with reference to FIG. 4.

A tapered surface 8c is formed in the vicinity of an external opening end of the radial lead hole 8. The tapered surface 8c is formed so as to continue to an inner peripheral surface of the radial lead hole 8 in a portion in which to insert the seal support 11 and the sealing member 12 and to spread in a conical shape toward the external opening end. Also, there is a ring-shaped tapered member 20 that has a same tapered angle as that of the tapered surface 8c and thereby fits to the tapered surface 8c. An inside diameter of the tapered member 20 is slightly larger than the outside diameter of the insulating tube 10. Regarding a dimensional relation between the tapered surface 8c and the tapered member 20, both have dimensions with which the sealing member 12 can be compressed to obtain a predetermined fastening force when the tapered member 20 is pushed in until it completely comes into close contact with the tapered surface 8c.

Assembly is the same as that of FIG. 3 described above until the sealing member 12 is inserted. Then, the tapered member 20 and a spacer 21 are placed on the sealing member 12. By threading the fastening nut 15 into the straight screw 9b of the radial lead 9 from above the spacer 21 and fastening the fastening nut 15, the sealing member 12 is fastened with a predetermined pressing force. Attachment of the slip ring connection lead 18 is the same as in the case of FIG. 3.

A function will now be described.

A sealing function of the sealing member 12 is ensured by fastening the fastening nut 15 to the straight screw 9b provided to the radial lead 9 via the tapered member 20 and the spacer 21. In order to ensure the sealing function, as has been described in the first embodiment above, it is preferable to manage a fastening force of the sealing member. However, in a case as in FIG. 3 of the first embodiment above where the structure has no tapered member 20, there arises a need for a work to manage a fastening torque when the fastening nut 15 is fastened. The fastening work therefore becomes complex and tedious. In contrast, in this embodiment, the tapered surface 8c is provided to the radial lead hole 8 and the tapered member 20 of a dimension as described above is interposed. Hence, when the fastening nut 15 is fastened, it becomes possible to fasten the sealing member 12 with a predetermined fastening force by merely fastening the fastening nut 15 to full interference of the tapered member 20 without particularly having to take a fastening torque into consideration.

In the configuration of FIG. 4, a screw portion is not provided to the radial lead hole 8 as in the first embodiment above. Hence, improvement of strength against fatigue can be expected. However, as is understood from the verification result of the basic technology, the radial lead hole 8 formed in the shape of a circular prism is forced by torsion to change a cross section of a circular shape to a cross section of an elliptical shape in a direction of torsion. Herein, because the tapered member 20 of an annular shape is inserted, there are differences in contact in a circumferential direction on the tapered contact surfaces when observed closely in detail. A configuration of a radial lead portion that is further improved in this point will be described in the following.

Figure 5:
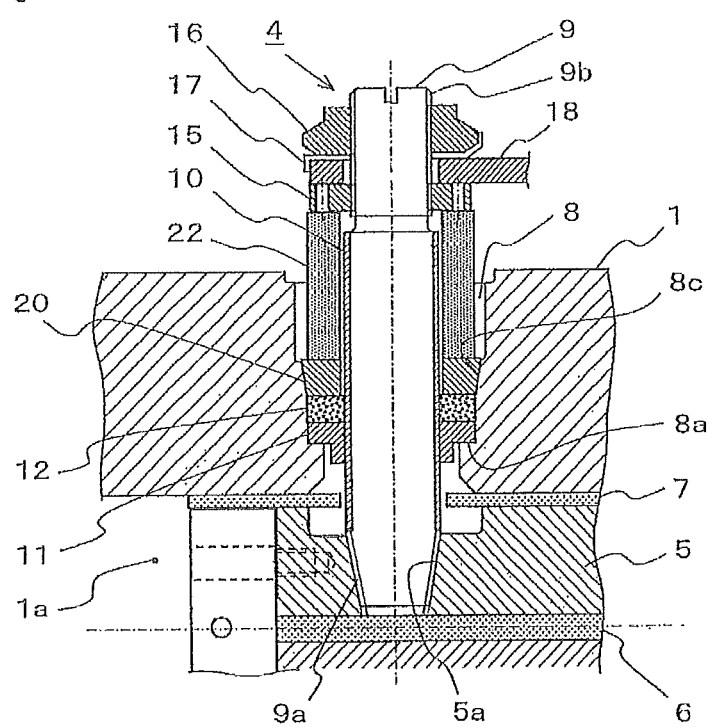
FIG. 5 is a partial cross section showing another example of the radial lead portion of the rotating electrical machine according to the second embodiment of the invention.

FIG. 5 is a modification of FIG. 4 and portions same as those of FIG. 4 are labeled with same reference numerals. A different point is that an installation region of the tapered member 20 is moved toward the shaft center of the rotation shaft 1 as close as possible. The rest is the same as in FIG. 4. It should be noted, however, that a spacer 22 is longer than the counterpart in FIG. 4.

As in FIG. 4, because a screw portion is not provided to the radial lead hole 8, there is no weak point in strength against fatigue caused by rotary bending and torsional vibration on the screw portion. Further, in comparison with FIG. 4, the installation region of the tapered member 20 is moved closer to the shaft center of the rotation shaft 1. Hence, in comparison with the structure of FIG. 4, this structure is less susceptible to rotary bending and torsional vibration.

As has been described, according to the fixing structure of a radial lead of a rotating electrical machine of the second embodiment, a tapered surface continuing to an inner peripheral surface of the radial lead hole in which the sealing member is installed and spreading toward an external opening end is formed. Also, the fixing structure has a ring-shaped tapered member that fits to the tapered surface, and the tapered member is interposed between the sealing member and the spacer. Hence, as with the first embodiment above, because a screw portion that becomes a weak point for strength against fatigue caused by rotary bending and torsional vibration is not provided to the radial lead hole, strength against fatigue can be enhanced in comparison with a case where the screw portion is provided. Further, by interposing the tapered member, it becomes possible to fasten the sealing member with a predetermined fastening force by merely fastening the fastening nut to full interference of the tapered member without particularly having to take a fastening torque into consideration. Consequently, a fastening work becomes simple.

The first and second embodiments have been described using a synchronous generator as an example of the rotating electrical machine. It should be appreciated, however, that the invention is applicable to rotating electrical machines in general having similar radial lead portions.

The invention claimed is:

1. A fixing structure of a radial lead of a rotating electrical machine, which is furnished with a function of connecting slip rings provided to a rotation shaft of a rotor and axial leads provided inside a center hole of the rotation shaft and supplying a current to a rotor coil and a function of preventing a leakage of a refrigerant gas within the rotation shaft, wherein:
   the radial lead is inserted into a radial lead hole penetrating through the rotation shaft in a radial direction from the center hole, the inner surface of the radial lead hole being free of screw threads, and a male screw formed at one end is threaded into a female screw formed in the axial lead and fixed therein while the other end is electrically connected to the slip ring; and
   a sealing member installed to a step portion of the radial lead hole is fastened, via a spacer, by a fastening nut threaded into the other end of the radial lead, so that a side of the center hole is maintained airtight from an outside.

2. The fixing structure of a radial lead of a rotating electrical machine according to claim 1, wherein:
   the sealing member is fastened with a managed predetermined fastening force.

3. The fixing structure of a radial lead of a rotating electrical machine according to claim 2, wherein:
   the fastening force is such that a sink-in amount of the sealing member is 2.7 mm or more.

4. The fixing structure of a radial lead of a rotating electrical machine according to claim 1, wherein:
   a tapered surface continuing to an inner peripheral surface of the radial lead hole in which the sealing member is installed and spreading toward an external opening end is formed;
   the fixing structure has a ring-shaped tapered member that fits to the tapered surface; and
   the tapered member is interposed between the sealing member and the spacer.

* * * * *